US008665467B2

(12) United States Patent
Sumi (10) Patent No.: US 8,665,467 B2
(45) Date of Patent: Mar. 4, 2014

(54) IMAGE PROCESSING APPARATUS AND METHOD EXTRACTING STILL IMAGES FROM A MOVING IMAGE, SYSTEM HAVING SUCH APPARATUS, PRINTING APPARATUS USED IN SUCH SYSTEM, AND COMPUTER-READABLE MEDIUM STORING A PROGRAM EXECUTED BY A COMPUTER THAT EXTRACTS STILL IMAGES FROM A MOVING IMAGE

(75) Inventor: Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 736 days.

(21) Appl. No.: 12/574,744

(22) Filed: Oct. 7, 2009

(65) Prior Publication Data

US 2010/0097642 A1 Apr. 22, 2010

(30) Foreign Application Priority Data

Oct. 17, 2008 (JP) ................. 2008-269185

(51) Int. Cl.
*G06F 3/12* (2006.01)

(52) U.S. Cl.
USPC .......... 358/1.15; 358/537; 358/540; 382/236; 382/284; 382/294

(58) Field of Classification Search
USPC ............... 358/1.1, 1.15, 537, 538, 540, 1.12; 382/190, 236, 284, 294
See application file for complete search history.

(56) References Cited

U.S. PATENT DOCUMENTS 7,366,360 B2   4/2008  Takiguchi et al. ............ 382/284
8,068,693 B2 * 11/2011  Sorek et al. .................. 358/540
2006/0290960 A1 * 12/2006  Matsuhira ..................... 358/1.12
2008/0231892 A1 *  9/2008  Sugahara et al. ............. 358/1.15
2009/0074304 A1 *  3/2009  Momosaki .................... 382/224
2009/0080020 A1 *  3/2009  Kitagawa ...................... 358/1.15

FOREIGN PATENT DOCUMENTS

| JP | 9-90530 | 4/1997 |
| JP | 2002-170111 | 6/2002 |
| JP | 2005-197910 A | 7/2005 |
| JP | 2006-5856 | 1/2006 |
| JP | 2006-60339 | 3/2006 |
| JP | 2008-67110 | 3/2008 |

OTHER PUBLICATIONS

English Machine Translation of JP 2008-067110-A (Taguchi et al., Published Mar. 21, 2008).*
English Machine Translation of JP-H09-130591 A (Sumiya, Published May 16, 1997).*
Japanese Office Action dated Nov. 9, 2012, in counterpart Japanese Application No. 2008-269185.

* cited by examiner

*Primary Examiner* — Benny Q Tieu
*Assistant Examiner* — Juan M Guillermety
(74) *Attorney, Agent, or Firm* — Fitzpatrick, Cella, Harper & Scinto (57) ABSTRACT

An image processing apparatus extracts still images from a moving image and performs an image process. A parameter indicating characteristics of moving image data is extracted, and the number of still images is determined based on the parameter indicating characteristics of the moving image data. Then, based on a determined number of still images, still images are extracted from the moving image, the extracted still images are saved as a single file, and the image process is carried out using saved still images.

9 Claims, 10 Drawing Sheets

IMAGE PROCESSING APPARATUS AND METHOD EXTRACTING STILL IMAGES FROM A MOVING IMAGE, SYSTEM HAVING SUCH APPARATUS, PRINTING APPARATUS USED IN SUCH SYSTEM, AND COMPUTER-READABLE MEDIUM STORING A PROGRAM EXECUTED BY A COMPUTER THAT EXTRACTS STILL IMAGES FROM A MOVING IMAGE

BACKGROUND OF THE INVENTION

1. Field of the Invention

The present invention relates to an image processing apparatus, an image processing method, a printing apparatus, a printing method, a medium storing a program, and an image processing system, that process still images.

2. Description of the Related Art

A conventional technique that extracts partial data from a moving image and uses that data as a still image is known.

Japanese Patent Laid-Open No. 2006-60339 discloses a mobile communication terminal that extracts multiple pieces of still image data from moving image data and generates composite image data therefrom, while suppressing the processing load.

Japanese Patent Laid-Open No. 2006-5856 discloses extracting a desired still image from reproduced video, and recording the extracted still image based on the DCF standard, which concerns recording and reproduction.

The quality of a still image extracted from a moving image has problems, such as the low number of pixels, the small amount of color difference information, and so on. However, as is disclosed in Japanese Patent Laid-Open No. 2008-67110, it is known that the image quality can be improved by performing image correction and image processing using multiple still images.

Japanese Patent Laid-Open No. 2002-170111 and Japanese Patent Laid-Open No. H9-90530 disclose image processing techniques that enable a panoramic image to be obtained by combining multiple still images.

SUMMARY OF THE INVENTION

Image processes that use multiple still images, such as those described above, require different numbers of still images depending on the correction and processing methods, the format of the moving image from which the still images were extracted, and so on. However, the conventional techniques had no schemes for managing the number of extracted still images while taking into consideration both the details of image processes, such as the stated image correction and processing, and the format of the moving image, when extracting still images from moving images. For this reason, there was a problem that capacity was either wasted or was insufficient with respect to the data amount of the still images required for the image processing.

The present invention provides an image processing apparatus, an image processing method, a printing apparatus, a printing method, a medium storing a program, and an image processing system, that are capable of extracting and managing an appropriate amount of still images from a moving image.

The present invention provides an image processing apparatus that extracts multiple still images from a moving image and performs an image process, the apparatus comprising:

a parameter extraction unit configured to extract a parameter indicating characteristics of the moving image data;

a determination unit configured to determine a number of the multiple still images based on the parameter indicating characteristics of the moving image data;

an extraction unit configured to extract multiple still images from the moving image based on the number of still images determined by the determination unit;

a saving unit configured to save the multiple still images extracted by the extraction unit as a single file; and a processing unit configured to perform an image process using the multiple still images saved in the saving unit.

The image processing apparatus can perform image processing while managing the amount of still images obtained from a moving image, which is appropriate for the purpose of the image processing. Furthermore, by managing the multiple extracted still images as a single file, it is possible to improve the efficiency of reuse, file transfers, and so on.

Further features of the present invention will become apparent from the following description of exemplary embodiments with reference to the attached drawings.

DESCRIPTION OF THE EMBODIMENTS

Hereinafter, embodiments of the present invention shall be described in detail with reference to the drawings. Note that identical constituent elements shall be given identical reference numerals, and descriptions thereof shall be omitted. Note also that "pre-processing" according to the present invention refers to the processes spanning from the extraction of multiple still images from the moving image to the saving of a file, whereas "post-processing" refers to the image processing performed using the multiple still images.

First Embodiment

The present embodiment shall describe an image processing system that, as post-processing, takes multiple extracted still images as its input, generates a high-resolution composite image using a printer, and prints the composite image.

<Digital Video Camera Configuration>

Figure 1:
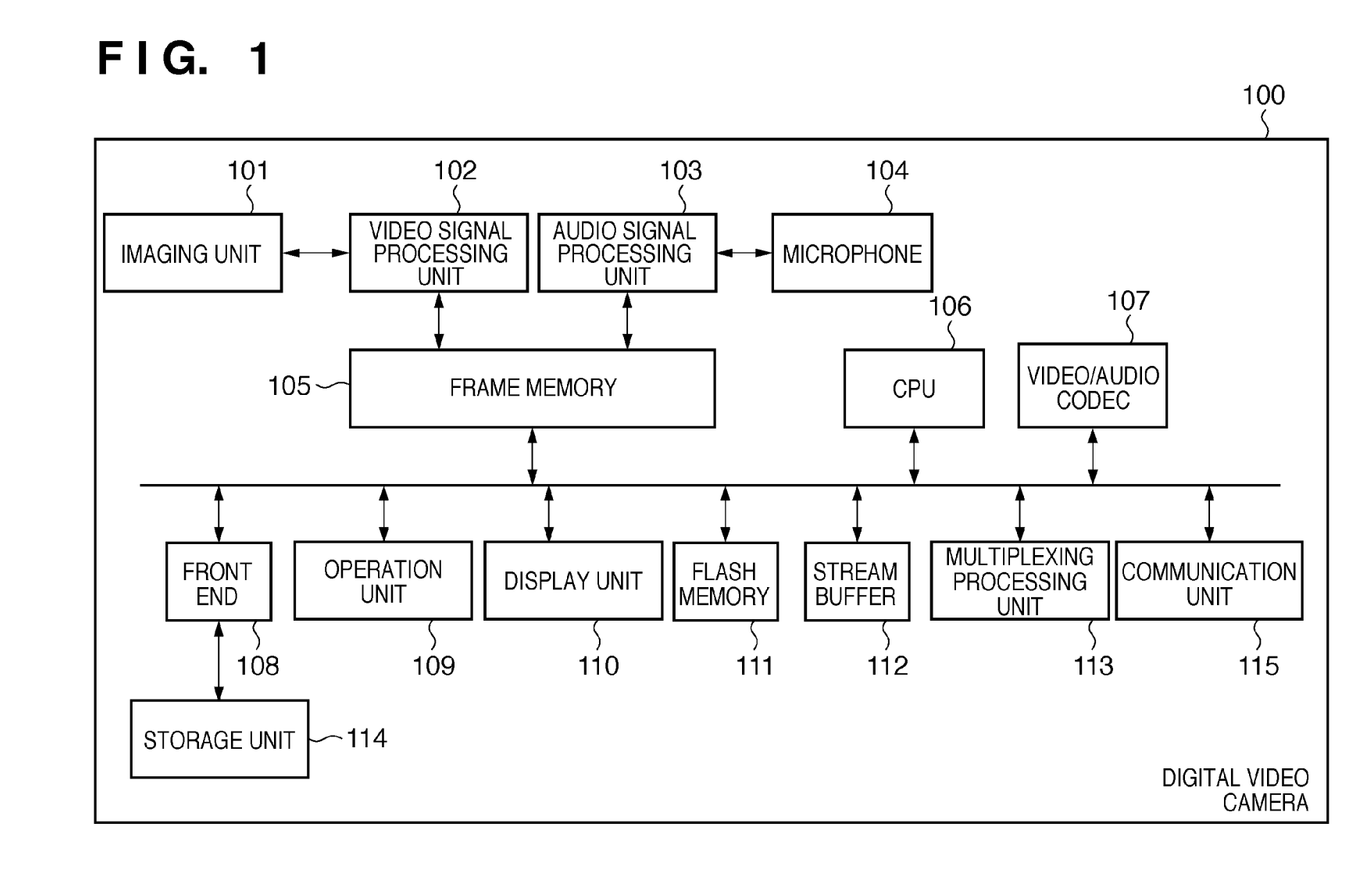
FIG. 1 is a block diagram illustrating the internal configuration of a digital video camera 100 according to a first embodiment of the present invention.

FIG. 1 is a block diagram illustrating the configuration of a digital video camera 100 according to the present embodiment. The digital video camera 100 includes an imaging unit 101, a video signal processing unit 102, an audio signal processing unit 103, a microphone 104, a frame memory 105, and a CPU (central processing unit) 106. The digital video camera 100 further includes a video/audio codec 107, a front end (analog FE) 108, an operation unit 109, a display unit 110, a flash memory 111, and a stream buffer 112. Furthermore, the digital video camera 100 includes a multiplexing processing unit (multiplexer/demultiplexer) 113, a storage unit 114, and a communication unit 115.

The imaging unit 101 converts a subject image into an electric signal (a video signal), and includes functionality for capturing moving images and still images. The video signal processing unit 102 performs A/D conversion and appropriate image processes on the video signal obtained by the imaging unit 101.

The microphone 104 captures audio from the exterior. The audio signal processing unit 103 performs A/D conversion and appropriate signal processes on the audio signal obtained by the microphone 104.

During recording, the frame memory 105 buffers the video/audio data obtained through the imaging until that data is encoded/multiplexed. Furthermore, during reproduction, the frame memory 105 buffers the demultiplexed/decoded video/audio data until that data is output.

The video/audio codec 107 compresses and encodes the video data and audio data during imaging and recording, and converts the compressed and encoded data into video data and audio data during reproduction.

The front-end 108 writes data into the storage unit 114, which is a hard disk, reads out data from the storage unit 114, and so on. The operation unit 109 accepts input operations, for operating the digital video camera 100, from a user.

The display unit 110 includes a liquid crystal screen (not shown), and has functions for displaying video shot by the camera during recording, displaying reproduced video during reproduction, and displaying settings menus and the like for the digital video camera 100.

The flash memory 111 is a non-volatile memory for storing data that is necessary to be retained even when the power is turned off, from among the information that cannot be written into the storage unit 114 in real time during recording. Note that the flash memory 111 is also used to store information that is necessary to restore the camera to a functional state when, for example, the battery has been disconnected during shooting.

The stream buffer 112 holds multiplexed stream data. The multiplexing processing unit (multiplexer/demultiplexer) 113 generates stream data in which compressed and encoded video/audio data has been multiplexed, and also demultiplexes stream data, thereby generating video/audio data.

The storage unit 114 is a hard disk to and from which data can be written and read; during recording, data such as video, still images, and the like is recorded into that hard disk, and during reproduction, data such as video, still images, and the like is read out from that hard disk.

The communication unit 115 has functionality for exchanging information and files with an external device; the communication unit 115 is connected to the external device using a USB cable, and exchanges data therewith according to a known standard.

<Printer Configuration>

Figure 2:
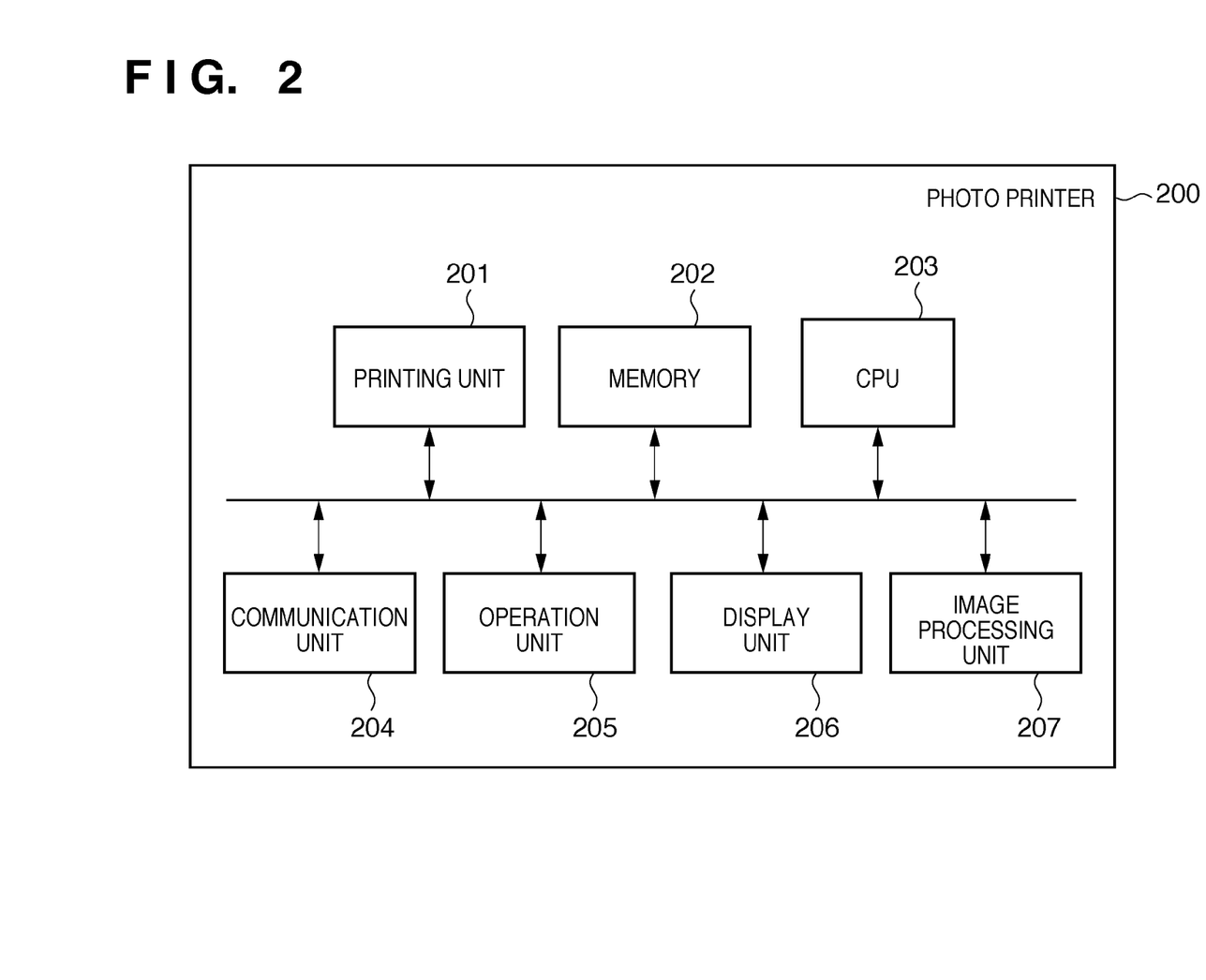
FIG. 2 is a block diagram illustrating the internal configuration of a photo printer according to first and third embodiments of the present invention.

FIG. 2 is a block diagram illustrating the configuration of a photo printer according to the present embodiment. The photo printer 200 includes a printing unit 201, a memory 202, a CPU 203, a communication unit 204, an operation unit 205, a display unit 206, and an image processing unit 207.

The printing unit 201 performs a resizing process, a color mapping process, a color analysis process, a tone correction process, and a quantization process on image data stored in the memory 202 based on printing settings, and then deposits cyan, magenta, yellow, and black inks onto printing paper, thereby recording an image onto the printing paper.

The communication unit 204 has functionality for exchanging information and files with an external device; the communication unit 204 is connected to the external device using a USB cable, and exchanges data therewith according to a known standard.

The operation unit 205 accepts input operations, for operating the photo printer 200, from a user. The display unit 206 includes a liquid crystal screen (not shown), and has functionality for displaying a printing settings menu and the like.

The digital video camera 100 and the photo printer 200 are connected by USB cable, and the communication unit 115 of the digital video camera 100 and the communication unit 204 of the photo printer 200 exchange data according to a known method.

Figure 3:
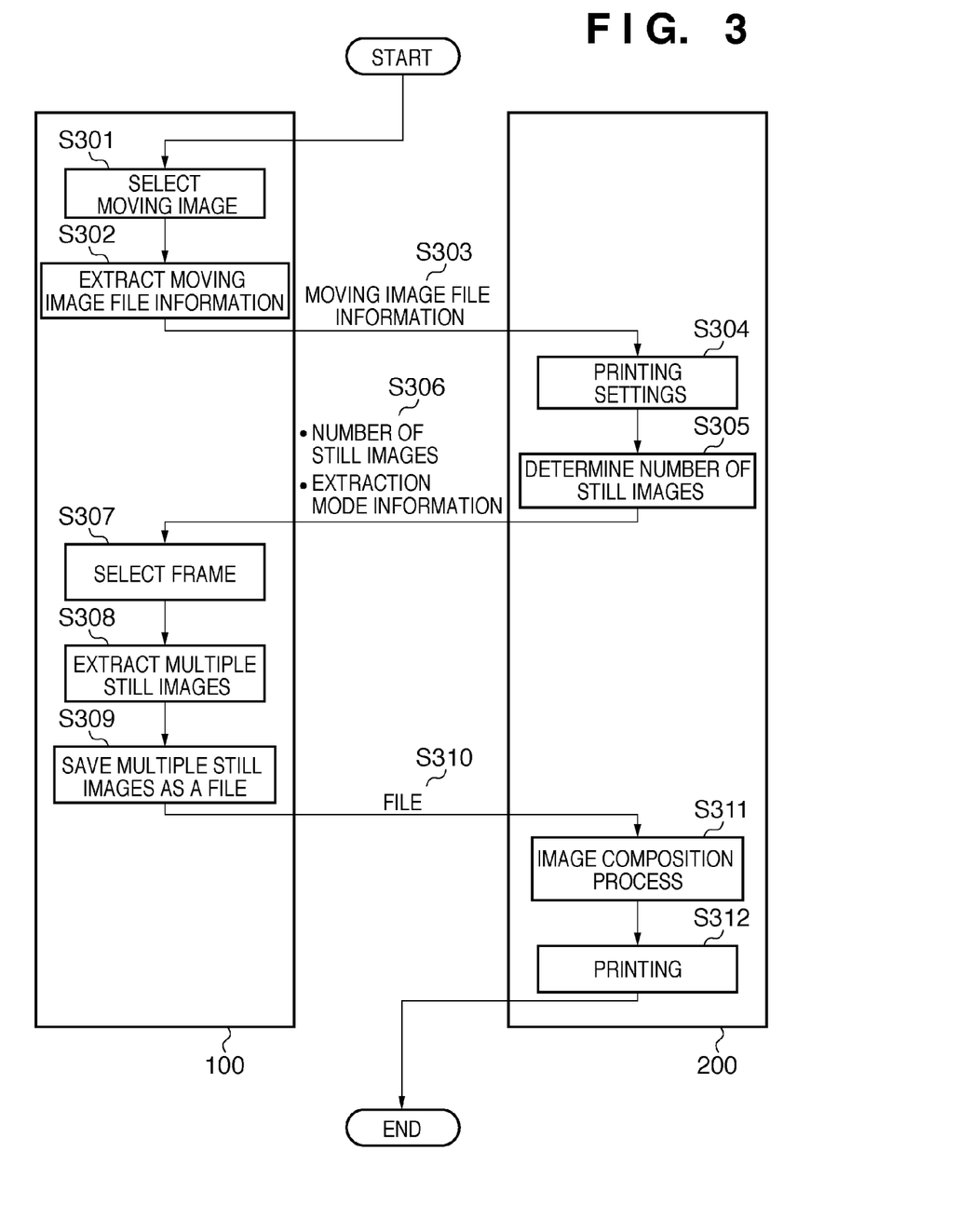
FIG. 3 is a flowchart illustrating a processing procedure according to the first embodiment of the present invention.

FIG. 3 is a flowchart illustrating the flow of processing according to the present embodiment. First, a moving image file is selected by the digital video camera 100, as a result of the user operating the operation unit 109 and the display unit 110 (step S301).

Next, the parameters of the selected moving image file, including the recording format, the presence or absence of interlacing, the color format of the brightness and color difference signals, and information regarding the width and the height of the image, are extracted (parameter extraction), and the extracted parameters are taken as moving image file information (step S302).

The "recording format" refers to the format in which the moving image is encoded, such as MPEG-2, motion JPEG, or the like, whereas "the presence or absence of interlacing" refers to whether an interlaced format or a progressive format is employed for that moving image. The "color format of the brightness and color difference signals" refers to the ratio of the brightness and chroma components; formats such as 4:2:2, 4:2:0, and so on exist. Finally, the "width" of the image refers to the number of pixels in the horizontal direction when reproducing the moving image, whereas the "height" refers to the number of pixels in the vertical direction.

Next, the photo printer 200 obtains the moving image file information via the communication unit 204 (step S303). As the method for obtaining this information, there is a method in which the moving image file information is converted into a file and sent from the digital video camera 100 to the photo printer 200, and the photo printer 200 reads that file. Alternatively, the photo printer may analyze the file extension and file header information of the moving image file.

Next, printing settings are selected by the user via the display unit 206 and the operation unit 205 of the photo printer 200 (step S304).

Here, "printing settings" refers to the paper size, the paper type, the print grade (the print quality of the image processing results) and print speed, the presence or absence of borders, and the like. Note that the purpose for which images are used in the present embodiment is printing via the photo printer 200.

Next, in step S305, the photo printer 200 determines the number of still images that are necessary to be managed in order to generate a composite image, based on the printing settings set in step S304, the received moving image file information, and the capabilities of the photo printer's image correction processes.

As described earlier, the purpose for which images are used in the present embodiment is printing via the photo printer 200 based on the quality and size specified in the printing settings, using multiple images cut out from a moving image. To consider a different working example, if, for example, the purpose is displaying images on a liquid crystal display, a digital TV, or the like, the number of pixels and resolution, representing a target quality, can be determined based on the resolution of the display, the size of the display, and the like, and the number of still images to be managed can then be determined based thereupon.

The vertical size Sv[inch] and the horizontal size Sv[inch] actually printed on the surface of the paper are derived from the paper size and the presence/absence of borders as set in the printing settings in step S304. When settings are made so borders are present, Sv and Sh can be calculated by subtracting the lengths of the border portions from the vertical and horizontal lengths of the paper, respectively, whereas when settings are made so borders are absent, the vertical and horizontal lengths of the paper themselves correspond to Sv and Sh, respectively. Furthermore, some printers perform printing with printing paper in a protruded state in order to perform borderless printing, and in such a case, Sv and Sh can be calculated by adding the length by which the paper protrudes to the length of the paper.

Next, the necessary number of vertical pixels per unit length Rv[pixel/inch] and the necessary number of horizontal pixels per unit length Rh[pixel/inch] are calculated based on the print grade and paper type settings. A resolution the photo printer 200 is capable of being expressed through the printing settings by Rv and Rh, or the visual properties of humans may be taken into consideration, and a numerical value within the resolutions the photo printer 200 is capable of expressing may be used as Rv and Rh. Note that Rv and Rh are set so as not to exceed the resolution that the photo printer 200 is capable of expressing.

Next, the number of vertical pixels necessary for printing Pv[pixel] and the number of horizontal pixels necessary for printing Ph[pixel] are calculated based on formulas (1) and (2), using Sv, Sh, Rv, and Rh.

$$Pv = Sv \times Rv \quad (1)$$

$$Ph = Sh \times Rh \quad (2)$$

Next, the basic scale B of the number of still images is obtained. First, the vertical scale and the horizontal scale are obtained based on Pv and Ph, and on the width and the height of the image. The scales are calculated using the following formulas (3) and (4).

$$\text{vertical scale} = Pv \div \text{height of moving image (inch)} \quad (3)$$

$$\text{horizontal scale} = Ph \div \text{width of moving image (inch)} \quad (4)$$

Here, the greater value of the vertical scale and the horizontal scale is used as the scale B of the number of still images.

when vertical scale>horizontal scale, B=vertical scale
when vertical scale<horizontal scale, B=horizontal scale
when vertical scale=horizontal scale, B=vertical scale Here, if both the vertical scale and the horizontal scale are less than 1, B is taken as 1.

Next, the required scale C is calculated based on the calculated basic scale B and the image correction process capabilities. C is calculated using a function f, which uses B as its argument.

$$C = f(B) \quad (5)$$

In the present embodiment, the execution of the image composition process, which is an image correction process, using the extracted multiple still images, represents the post-processing. Based on the capabilities of the image composition process used in the present embodiment, 4 base still images are necessary for an image resolution of 2×, whereas 16 base still images are necessary for image resolution of 4×. In other words, the above formula (5) can be rewritten as the following formula (6) (where "^2" represents a power of 2).

$$C = B^2 \quad (6)$$

Next, a scale R, based on the moving image file information, is found. The default value of R is 1. R is different based on the presence or absence of interlacing; if an interlaced format is used, R is 2× (R is replaced with R×2 and updated), whereas if a progressive format is used, R is 1. The reason for this is that although in a progressive format, a single frame corresponds to a single image, in an interlaced format, the odd-numbered and even-numbered rows in a single frame are treated as different images, and therefore the number of pixels in the vertical direction is substantially half. Therefore, with an interlaced format, a single frame does not necessarily correspond to a single image; however, for the sake of simplicity, the following descriptions shall discuss a single frame as corresponding to a single image.

If the color format of the brightness and color difference signal is 4:4:4, the brightness data in the color difference data can be reproduced for the entire number of pixels in the image, and therefore R is 1×. However, if the color format of the brightness and color difference signal is 4:2:2, only half of the color difference information is recorded relative to the total number of pixels, and therefore R is 2×.

Meanwhile, if the color format of the brightness and color difference signal is 4:2:0, only ¼ of the color difference information is recorded relative to the total number of pixels, and therefore R is 4×. Note that only the brightness information is used if a monochromatic mode is set in the printing settings, and thus there is no need to take the color difference information into consideration in this manner.

The number of still images to be managed is determined through the following formula (7), using R as calculated from the moving image file information and the required scale C mentioned above.

$$\text{number of still images to be managed} = C \times R \quad (7)$$

After the number of still images to be managed has been determined, the extraction mode is determined. For example, if the recording format of the moving image is motion JPEG, inter-frame prediction (compression) is not performed, and thus the extraction mode is set to "normal", whereas if the recording format of the moving image is MPEG, the extraction mode is set to "inter-frame prediction extraction".

The information of the number of still images and the extraction mode obtained as described above is then sent to the digital video camera 100 via the communication unit 204 (step S306).

In the digital video camera 100, moving image frame selection is then performed by the user using the display unit 110 and the operation unit 109 (step S307). This frame selection is carried out while reproducing the moving image.

Here, moving image reproduction shall be described. Data read out from the storage unit 114 by the front end 108 is stored in the stream buffer 112. Furthermore, that data is then divided into a video stream and an audio stream by the multiplexing processing unit 113 and the video/audio codec 107, and those streams are then stored in the frame memory 105.

The video signal processing unit 102 and the audio signal processing unit 103 then perform appropriate signal processes on the video stream and the audio stream, and then output the respective streams to a liquid-crystal panel in the display unit 110 or a speaker (not shown). The user specifies the desired frame using the operation unit 109, which completes the frame selection.

After the frame selection, the digital video camera 100 extracts, from the moving image, a number of still images corresponding to the number of still images to be managed as calculated in step S305 (step S308).

Here, if the extraction mode is "normal", the number of still images to be managed is extracted starting with the selected frame and including the frames adjacent thereto. However, if the extraction mode is "inter-frame prediction extraction mode", the extraction is performed in the manner described hereinafter.

Figure 4:
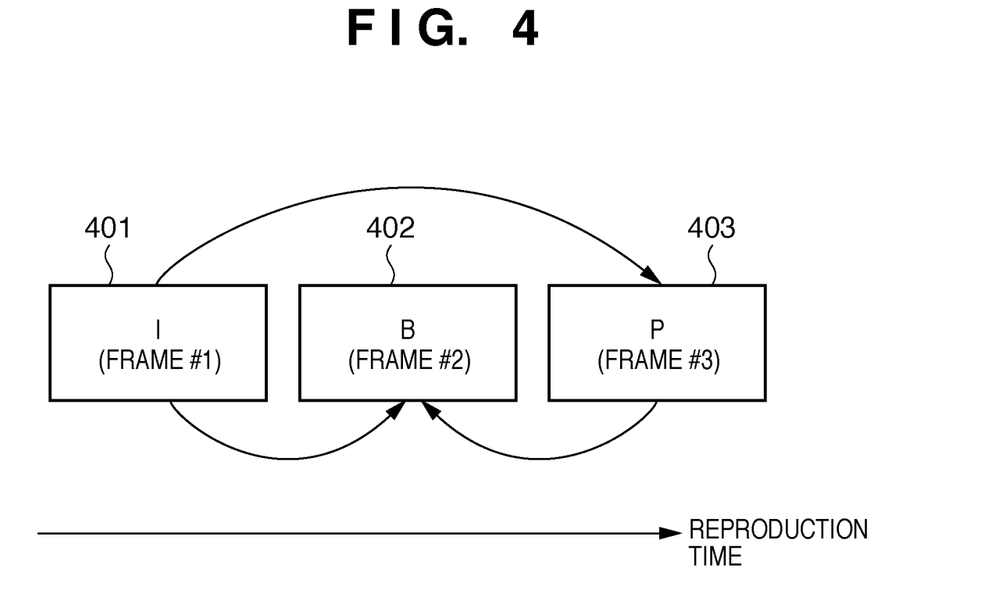
FIG. 4 is a diagram illustrating the concept of inter-frame prediction.

FIG. 4 is a conceptual diagram illustrating an example of inter-frame prediction. There are three types of frames, or I-frames, P-frames, and B-frames. These frames shall be described using FIG. 4.

Reference numeral 401 indicates an I-frame. I-frames can be reproduced independently as still images, in the same manner as JPEGs.

Reference numeral 403 indicates a P-frame. P-frames primarily record information of the differences from I-frames, and therefore often contain less data than an I-frame. Furthermore, a P-frame image can be reproduced using an I-frame.

Reference numeral 402 indicates a B-frame. B-frames primarily record information of the differences from the previous and following I- and P-frames, and the images of B-frames can be reproduced by using the I-frames and P-frames.

With such a structure, a moving image file on which inter-frame prediction has been performed often has a high image reproducibility when the frame order is I-frame, P-frame, and B-frame. Based on these properties that frames have with respect to one another, when the extraction mode is "inter-frame prediction extraction mode", still images are extracted using the I-frame previous to the selected frame as the starting frame, and the frames adjacent thereto, extending to the I-frame immediately after the number of still images to be managed has been reached, are extracted. In other words, more still images than the number of still images to be managed are extracted. Unused frames may be deleted, or may be saved as is, using a method that shall be described later.

Furthermore, because the image quality of I-frames, P-frames, and B-frames differs, as described above, the number of still images to be extracted is determined as described below. Specifically, each frame is multiplied by a coefficient in order to convert the number of still images. Because the I-frame corresponds to a normal single image, the I-frame is multiplied by a coefficient of 1. A P-frame is multiplied by a coefficient of 0.5, and thus a single frame corresponds to 0.5 of an image. In the same manner, a B-frame is multiplied by a coefficient of 0.25, and thus a single frame is handled as 0.25 of an image. In other words, when counting the number of still images to be managed, one I-frame, two P-frames, and four B-frames are counted as a single still image.

In addition, specific types of frames may be specified, and only those specified frames extracted. This "specification of specific types of frames" refers to specifying the type of frame to be extracted, such as, for example, specifying that only I-frames are to be extracted, specifying that I-frames and P-frames are to be extracted, specifying that I-frames, P-frames, and B-frames are to be extracted, and so on. Performing such specifications makes it possible to adjust the image quality and the post-extraction data amount.

As with the reproduction of moving images, when a still image is extracted, the video stream corresponding to the target frame undergoes signal processing performed by the video signal processing unit 102. After this signal processing, the result is temporarily saved in the frame memory 105 as still image data. The data of the multiple extracted still images that have been temporarily saved is concatenated, provided with a tag, edited as a single file, saved as a file unit, and managed (step S309).

Steps S308 and S309 performed above are examples of an extraction editing unit and a still image management unit, respectively, according to the present embodiment.

The number of still images, the vertical and horizontal number of pixels in the image, offset values for each image and information, and so on are denoted in the tag. In addition, information of the original moving image file, shooting information, the type of frame from which each still image was extracted, and so on may be denoted in the tag as well. Furthermore, each still image may be compressed, or the file as a whole may be compressed. In the present embodiment, multiple pieces of still image data are saved as a single file, but individual still images may be saved as individual files, and those individual files may be stored and saved in a folder.

The file is sent to the photo printer 200 via the communication unit 115 (step S310), and is then stored in the memory 202. The tag of the stored file is analyzed, and each of the multiple still images are reproduced.

The image processing unit executes the image composition process through a known method using the multiple still images (step S311), thereby generating a single still image of a resolution suitable for printing. The generated still image is stored in the memory 202 as image data, and is then printed onto paper by the printing unit 201 in accordance with the printing settings (step S312).

As described thus far, according to the present invention, it is possible to handle data of a size appropriate for the format of the moving image and appropriate for still image correction and processing, and furthermore, it is possible to manage multiple still images.

Sending a moving image file saved within the digital video camera 100 to the photo printer 200 puts a large burden on the communication unit 204 and the memory 202 of the photo printer.

However, in the present embodiment, only a part of the moving image is extracted as a still image and sent in that state, thereby reducing the communication-related burden. Furthermore, if the moving image file itself is to be sent to the photo printer 200, the photo printer 200 is required to have functions for reproducing the moving image and extracting still images. In the present embodiment, however, as long as the digital video camera 100 is provided with functions for reproducing the moving image and extracting still images, the photo printer 200 need not be provided with those same functions. Furthermore, it is possible to reuse the composite image by managing and saving the multiple still images as a single file.

Note that the object of the present application can still be achieved even if the printing settings information is received from the printer by the digital video camera 100 in step S306, the processing up to the image composition process is performed by the digital video camera based on the printing settings information, and the generated composite image is then sent to the printer and printed.

Second Embodiment

Figure 5:
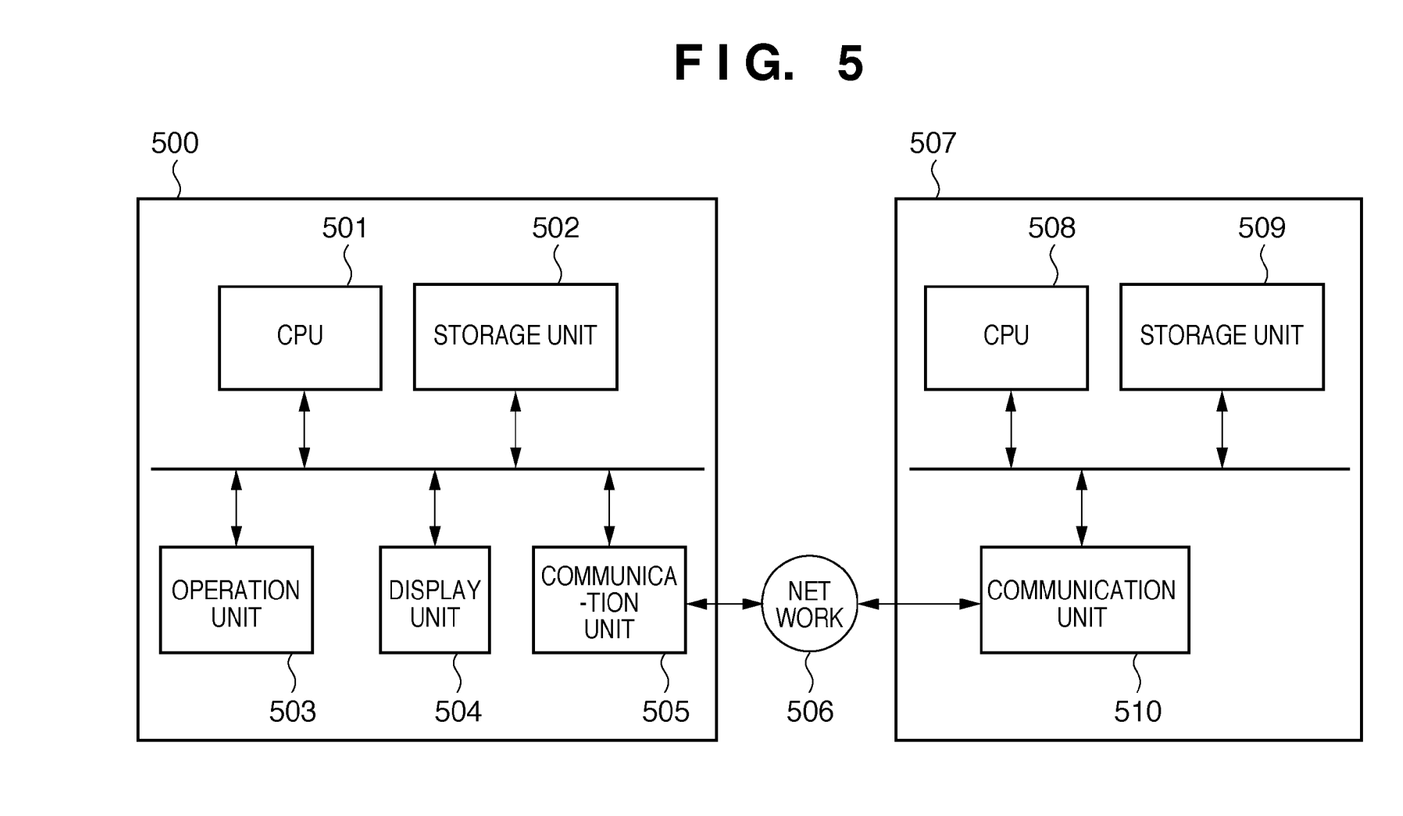
FIG. 5 is a block diagram illustrating a PC and a server according to a second embodiment of the present invention.

In the second embodiment, a system that includes a PC and a server shall be described. FIG. 5 is a block diagram illustrating the configuration of the system including a PC and a server according to the present embodiment. Reference numeral 500 is a PC. The PC includes a CPU 501, a storage unit 502, an operation unit 503, a display unit 504, and a communication unit 505.

The storage unit 502 is an HDD and a memory. The operation unit 503 is a keyboard and a mouse, which a user can use to make inputs to the PC 500. The display unit 504 is a display capable of communicating information from the PC 500 to the user. It is possible to output a menu screen or the like through the display, prompting the user to perform an operation, after which the user uses the keyboard and mouse to make selections and provide instructions.

Reference numeral 507 is a server. The server includes a CPU 508, a storage unit 509, and a communication unit 510. Like the storage unit 502, the storage unit 509 is an HDD and a memory. The PC 500 and server 507 are both connected to a network 506, and are capable of exchanging information with each other according to a known protocol via the communication units 505 and 510.

Here, the PC 500 is provided with application software. The application software is expanded in the storage unit 502 as a program. In the PC, computational processes are executed using the CPU 501 and the storage unit 502 based on instructions contained in the program expanded in the storage unit 502.

The application software is provided with a moving image reproduction function, a still image extraction function, a file saving function, and a scene selection function. These functions implement the configuration of the digital video camera 100 in the first embodiment as software, and perform the same processes thereas.

Meanwhile, the server 507 is provided with a function for reducing noise by composing multiple still images. This noise reduction function reduces noise by taking multiple still images and aligning those images, and then averaging the noise pixels within the resulting image. In the present embodiment, the noise reduction function, which is an image correction process, serves as the post-processing.

Figure 6:
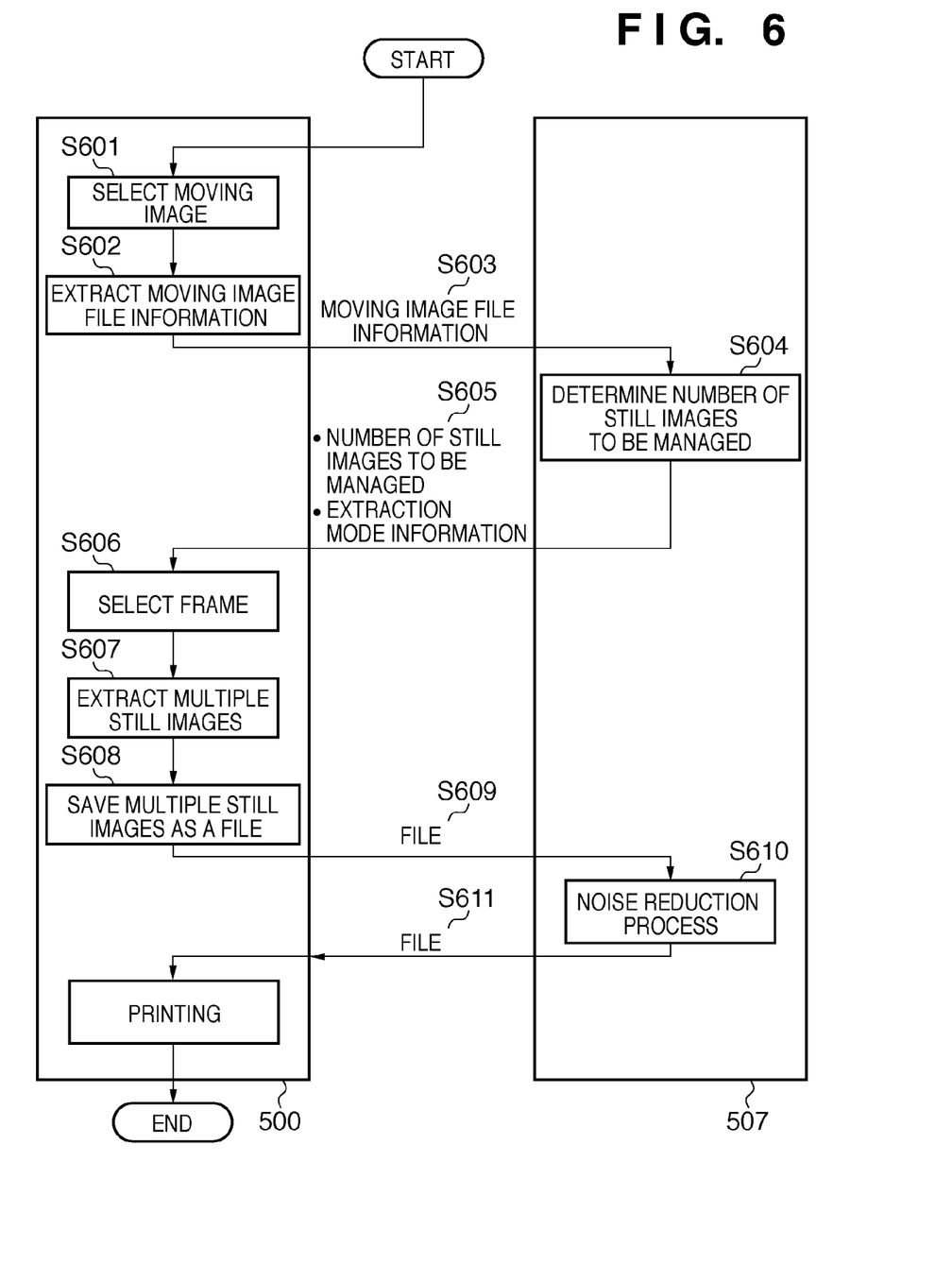
FIG. 6 is a flowchart illustrating a processing procedure according to the second embodiment of the present invention.

FIG. 6 is a flowchart illustrating the flow of processing according to the present embodiment. First, the user selects a moving image using the display unit 504 and the operation unit 503 of the PC, the selection being performed through the application software running on the PC 500. The moving image selection is performed by the user selecting a moving image file (step S601).

After a moving image file has been selected, the application software analyzes the file header of the selected moving image file and obtains shooting information of the moving image (step S602). Here, "shooting information" refers to information regarding the settings of the imaging device, such as the shutter speed, information added by the imaging device to the moving image file, such as the scene mode including a night scene mode, the ISO sensitivity, and so on. This shooting information is the moving image file information according to the present embodiment.

Here, because noise reduction is the post-processing in the present embodiment, information regarding the likelihood of noise arising is also obtained as shooting information. For example, if the post-processing is motion blur correction, information indicating details regarding motion blur, such as values outputted by a gyrosensor of the imaging device, the depth of field, the zoom ratio, and so on, is obtained. Alternatively, information added to the moving image file by the imaging device after the imaging device itself performs the analysis may be used as well.

The application software running on the PC sends the moving image file information to the server via the network 506 (step S603). The server then uses the shooting information to calculate, as the number of still images to be managed, the number of still images required by the noise reduction function of the server (step S604).

The server sets the number of still images to be managed based on the degree of ISO sensitivity. If the scene mode is the night scene mode, the server determines that there is a high degree of noise, and accordingly sets a greater number of still images to be managed. For example, the number of still images is determined using the following parameters: if the ISO sensitivity is 100 or less, the number of still images to be managed is set to two; if the ISO sensitivity is 200, the number of still images to be managed is set to four; and if the ISO sensitivity is 400, the number of still images to be managed is set to eight; and furthermore, if the night scene mode is being used, twice the number of still images than other modes is used.

The number of still images to be managed calculated in this manner is then sent to the PC (step S605). Here, the number of still images to be managed may be written in a file in a known XML format and sent to the PC, whereupon the application software running on the PC analyzes the XML and obtains the number of still images to be managed. Alternatively, the file may be sent in HTML format via a web browser, displayed on a screen, and communicated to the user thereby, after which the user inputs the number of still images to be managed into the application software.

After receiving the number of still images to be managed, the application software running on the PC allows the user to select a frame within the moving image using the display unit and the operation unit (step S606).

The frame selection is performed using the application software running on the PC, in the same manner as described in the first embodiment; therefore, detailed descriptions thereof shall be omitted.

After the frame has been selected, multiple still images including that frame are extracted in the same manner as in the first embodiment (step S607). At this time, a number of still images equivalent to the number of still images to be managed as obtained from the server is extracted.

The extracted multiple still images are saved as a single file, in the same manner as in the first embodiment (step S608), and that file is then sent to the server via the network 506 (step S609).

The server receives the file, reconstitutes each of the multiple still images, and performs the noise reduction process (step S610). A still image whose noise has been reduced is outputted as a result of the process. The server then sends the still image whose noise has been reduced to the PC via the network 506 (step S611). After that, processes such as printing are performed by the PC.

As described thus far, according to the present invention, it is possible to handle still image data of a size appropriate for the format of the moving image and appropriate for still image correction and processing. In addition, because a file of an appropriate size is sent, the processing can be executed without placing a large burden on the network 506. Furthermore, sending the multiple still images as a single file makes it possible to send those images as a single job.

Third Embodiment

Figure 7:
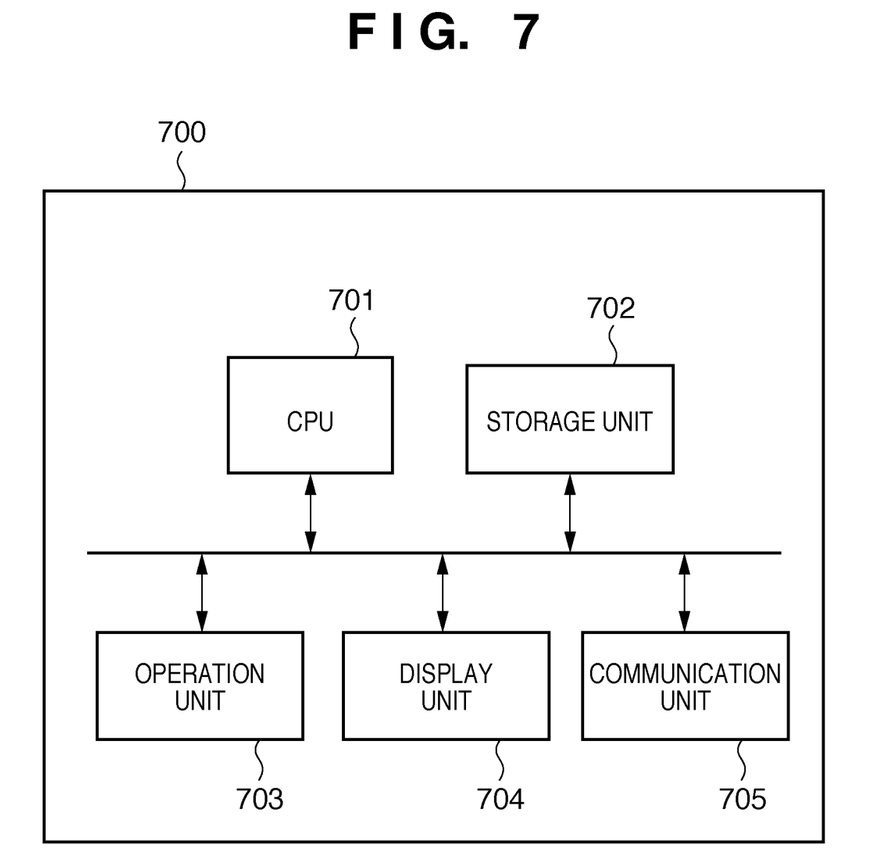
FIG. 7 is a block diagram illustrating the internal configuration of a PC according to third and fourth embodiments of the present invention.

FIG. 7 is a block diagram illustrating the configuration of the PC according to a third embodiment. A PC 700 includes a CPU 701, a storage unit 702, an operation unit 703, a display unit 704, and a communication unit 705. The storage unit 702 is an HDD and a memory. The operation unit 703 is a keyboard and a mouse, which a user can use to make inputs to the PC 700. The display unit 704 is a display capable of communicating information from the PC 700 to the user.

It is possible to output a menu screen or the like through the display, prompting the user to perform an operation, after which the user uses the keyboard and mouse to make selections and provide instructions. The communication unit 705 has functionality for exchanging information and files with an external device; the communication unit 705 is connected to the external device using a USB cable, and exchanges data therewith according to a known standard.

A photo printer configured as shown in FIG. 2 is used in the present embodiment.

Because the configuration of the photo printer 200 is the same as that of the first embodiment, detailed descriptions thereof shall be omitted. The PC 700 and the photo printer 200 are connected via a USB cable, and exchange data with each other in accordance with a known standard.

Here, the PC 700 is provided with application software. Furthermore, this application software includes a database regarding the image composition processes of the photo printer 200. This database holds the types of image processing functions that the photo printer 200 is provided with, and also holds the maximum value of the number of still images that those image processing functions are capable of processing. The post-processing in the present embodiment is the image composition process, and the maximum value of the number of still images that can be processed is 16.

Figure 8:
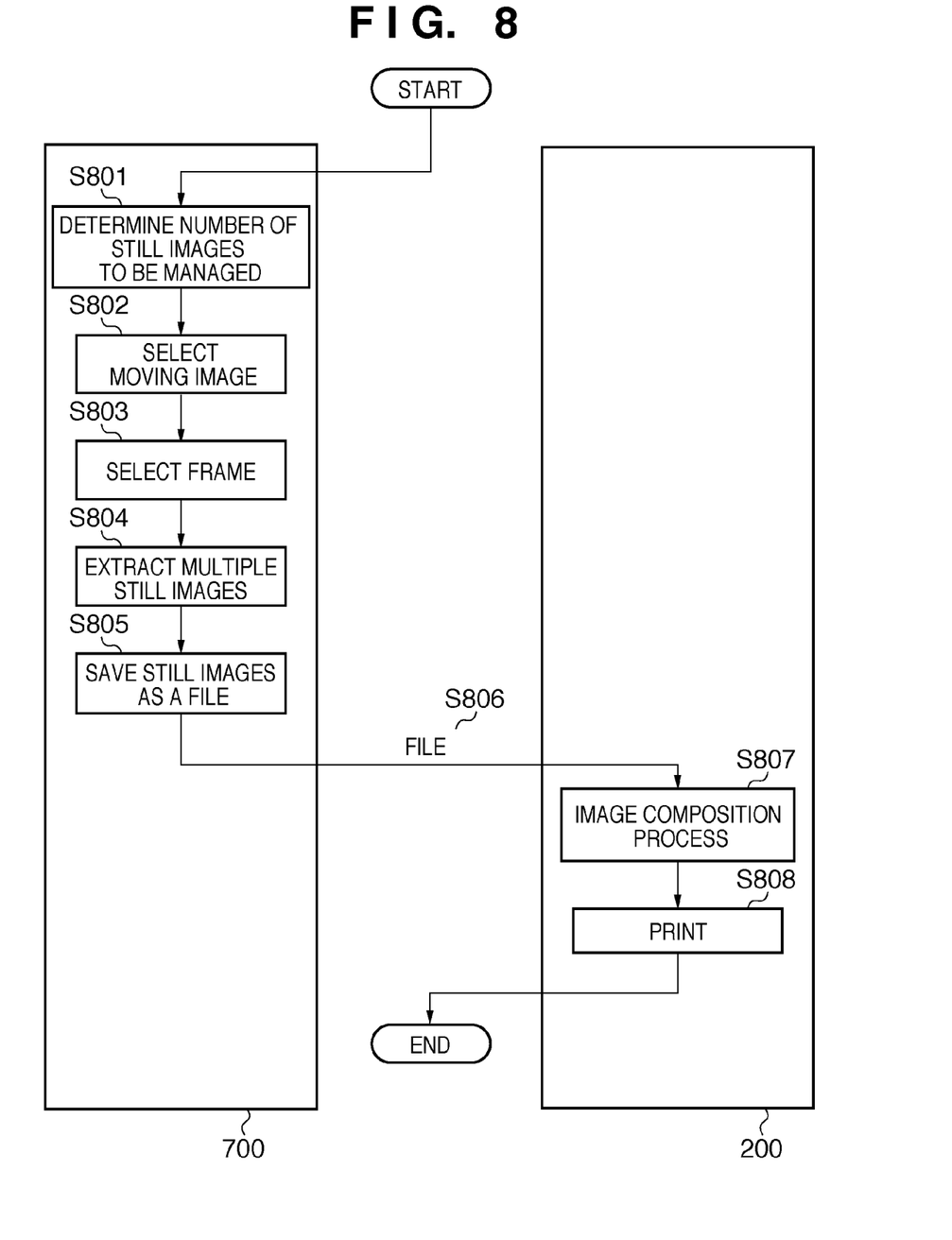
FIG. 8 is a flowchart illustrating a processing procedure according to the third embodiment of the present invention.

FIG. 8 is a flowchart illustrating the flow of processing according to the present embodiment. First, the printer to be used for output is selected through the application software running on the PC 700. In the present embodiment, only the photo printer 200 is connected to the PC 700 as a printer to be used for output, and therefore the photo printer 200 is automatically selected as the printer to be used for output. Note, however, that if multiple printers are connected, the printer to be used for output is selected by the user.

When the photo printer 200 is selected, the application software determines the number of still images to be managed (step S801). As described earlier, this application software includes a database regarding the photo printer 200. The maximum value of the number of still images that can be processed, or 16, is loaded from the database and used as the number of still images to be managed.

Here, rather than using the maximum value of the number of still images that can be processed, the application software may be provided with a function for determining the number of still images to be managed, as was performed in step S305 of the first embodiment, and the number may be calculated thereby.

Next, the user selects a moving image using the display unit 704 and the operation unit 703 of the PC. The moving image selection is performed by the user selecting a moving image file (step S802).

After the moving image file has been selected, the user selects a frame within the moving image using the display unit and the operation unit of the PC, through the application software (step S803).

The frame selection is performed in the same manner as described in the first embodiment, using the application software running on the PC; therefore, detailed descriptions thereof shall be omitted.

After the frame has been selected, the application software extracts multiple still images in the same manner as in the first embodiment, starting with the selected frame (step S804). At this time, 16 still images, which is the number of still images to be managed, are extracted.

Each of the 16 extracted images are saved as image files, and are stored in a temporary folder within the storage unit 702 (step S805).

After this, the saved 16 files are sent to the photo printer 200 via the communication unit 705 (step S806), and are then stored in the memory 202. File information and commands are also sent at this time. "File information" refers to information indicating that 16 images will be used when performing the image composition process, whereas "commands" refers to information instructing the image composition process to be performed.

The image processing unit executes the image composition process through a known method, using the 16 still images reproduced from the 16 files (step S807), thereby generating a single still image having an increased resolution.

The generated still image is stored in the memory 202 as image data, and is then printed, following printing processing, onto paper by the printing unit 201 (step S808).

As described thus far, according to the present embodiment, only the number of images that can be processed by the image composition processing function, which is the post-processing, are handled as extracted images, which reduces wasteful extractions and unnecessary data exchange. Therefore, it is possible to handle an amount of still images appropriate for still image correction and processing.

Fourth Embodiment

Next, a fourth embodiment shall be described. A PC configured as shown in FIG. 7 is used in the present embodiment as well.

Here, the PC 700 is provided with application software. The processing performed by the application software is divided into pre-processing and post-processing. Here, "pre-processing" refers to processing for selecting the moving image and the scene, extracting the still images, saving files, and so on. Meanwhile, "post-processing" refers to a process for concatenating multiple still images, thereby creating a panoramic image, according to a known technique. In the present embodiment, this panorama process is capable of processing a maximum of five images as input images.

Figure 9:
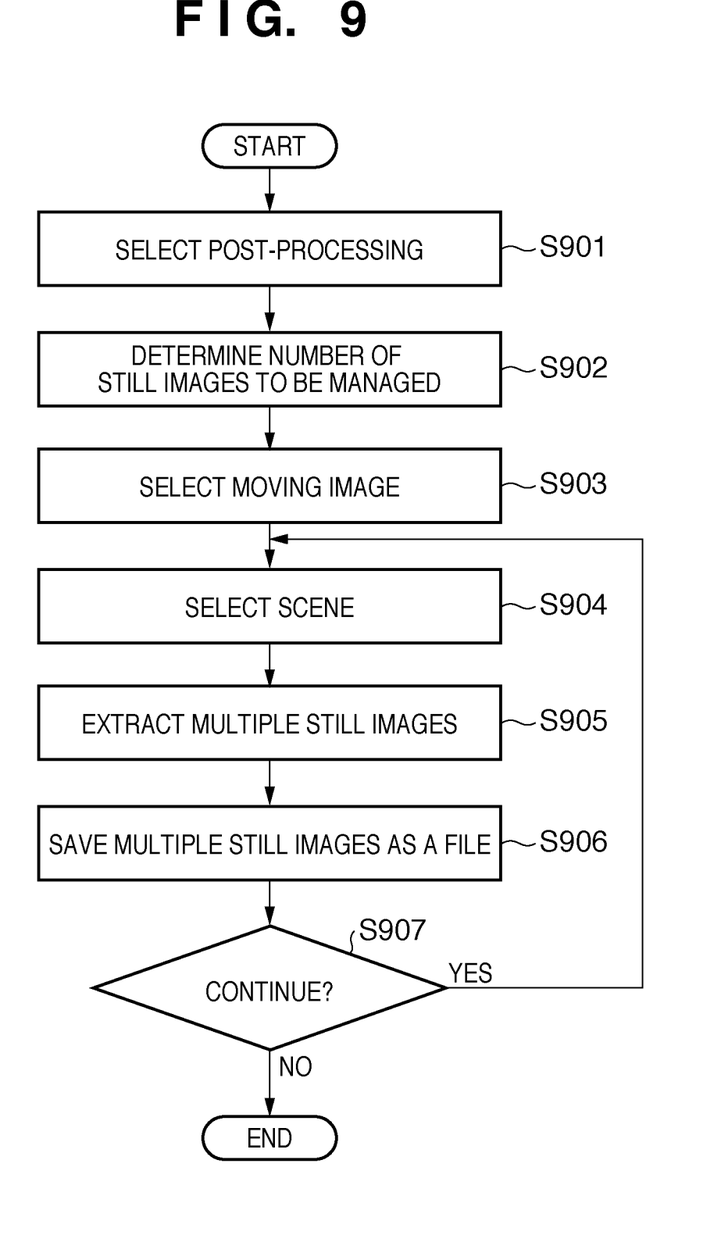
FIG. 9 is a flowchart illustrating a pre-processing procedure performed by application software according to the fourth embodiment of the present invention.

FIG. 9 is a flowchart illustrating the flow of the pre-processing performed by the application software. When the user launches the application software, the application software allows the user to select the post-processing using the display unit 704 and the operation unit 703 (step S901). The "selection of the post-processing" refers to selecting a post-processing image process provided in the application software. In the present embodiment, a panorama function provided in the application software is selected.

When the user selects the post-processing, the application software determines a number of still images to be managed appropriate for the selected post-processing (step S902). In the present embodiment, the number of still images to be managed is five, which is the maximum number of images that the panorama process of the post-processing can handle.

When the number of still images to be managed is determined, the application software allows the user to select the moving image file using the display unit 704 and operation unit 703 (step S903).

When the moving image file has been selected, the application software allows the user to select a scene using the display unit 704 and the operation unit 703 (step S904). The "selection of a scene" refers to determining the starting and ending frames of the frames from which still images are to be extracted. This selection is carried out while reproducing the moving image.

Once the scene selection is finished, the application software extracts the still images (step S905).

Here, the number of still images to be managed, or in other words, five still images, are extracted from the frames between the selected starting and ending frames. At this time, if there are more than five frames between the starting and ending frames, the still images are extracted therefrom at equal intervals.

For example, if there are 13 frames between the starting and ending frames, the first frame (the starting frame) may be taken as the first extracted image, the fourth frame may be taken as the second extracted image, the seventh frame may be taken as the third extracted image, and so on. Alternatively, only specific types of frames, such as I-frames, may be extracted.

If there are less than five frames between the starting and ending frames, all the frames from the starting frame to the ending frame are extracted.

Tags are added to the multiple extracted still images, and the data of the multiple still images is edited as a single file, and saved as a single file unit (step S906).

Once the file has been saved, the application software allows the user to select whether or not to continue the scene selection, using the display unit 704 and operation unit 703 (step S907).

If the user decides to continue the selection, the scene selection starts anew from step S904. The user can select a different scene from the scene selected the previous time. If, however, the user decides not to continue the selection, the application software proceeds to the post-processing.

Figure 10:
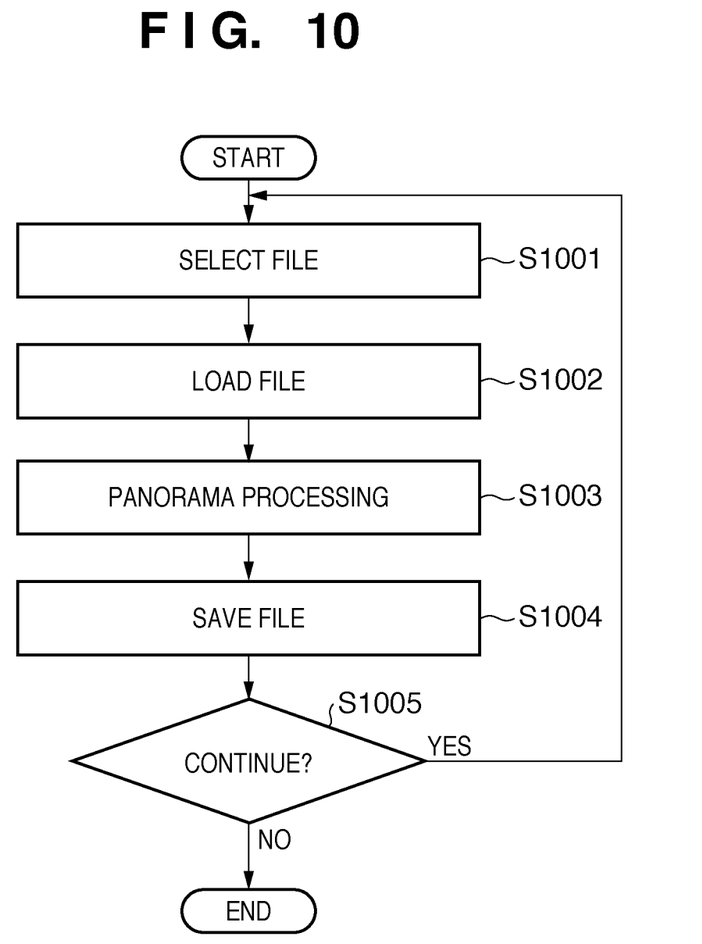
FIG. 10 is a flowchart illustrating a post-processing procedure performed by application software according to the fourth embodiment of the present invention.

FIG. 10 is a flowchart illustrating the flow of the post-processing performed by the application software. In the post-processing, first, the user is allowed to select a file using the display unit 704 and the operation unit 703 (step S1001). Here, the user selects the file saved as a result of the pre-processing. Note, however, that multiple files can be selected simultaneously here as well.

Once a file has been selected, the application software loads that file (step S1002). Here, the tag of the file is analyzed, and the multiple still images are reconstituted in the storage unit 702.

Next, the panorama processing is performed using the reconstituted multiple still images (step S1003). In the panorama processing, multiple images are concatenated, and a single image is outputted as a result.

The resulting panoramic image is saved as an image file (step S1004).

Once the file has been saved, the application software allows the user to select whether or not to continue the panorama processing, using the display unit 704 and the operation unit 703 (step S1005).

If the user decides to continue the process, the file selection starts anew from step S1001. However, if the user decides not to continue the process, the application software terminates. Note that if multiple files are selected in step S1001, the processing continues automatically until all of the selected files have been processed.

In the present embodiment, the pre-processing and post-processing are performed separately. This is because if the pre-processing and post-processing are designed to be performed together, the user will be required to stand by following the scene selection if the panorama processing takes time; therefore, the pre-processing and post-processing are separated, and the scene selection is performed all at once. Furthermore, such a design makes it possible to move the files saved as a result of the pre-processing to another PC, and perform the post-processing on that other PC.

As described thus far, according to the present embodiment, only the number of images that can be processed by the panorama function, which is the post-processing, are handled, which reduces wasteful extractions and unnecessary data exchange. Furthermore, although a panorama process was described as the post-processing in the present embodiment, it goes without saying that the same applies to any image process that uses multiple images, including image composition processes. Therefore, it is possible to handle an amount of still images appropriate for still image correction and processing.

Because the post-processing performed in the present invention is a process that uses multiple still images, it also includes processes such as, for example, a process for disposing multiple images within a layout frame, a pickup process for selecting images that meet certain conditions from multiple images, and so on.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-269185, filed Oct. 17, 2008, which is hereby incorporated by reference herein in its entirety.

What is claimed is:

1. An image processing apparatus that extracts pieces of still image data from moving image data and is able to generate still image data in which the extracted pieces of still image data are combined with each other, the apparatus comprising:

an information extraction unit configured to extract first information from the moving image data, wherein the first information indicates a feature of the moving image data and includes at least one of (i) information indicating a presence/absence of an interlace, (ii) color format information, (iii) information indicating a presence/absence of an inter-frame prediction, and (iv) shooting information;

an obtaining unit configured to obtain second information indicating a feature of image processing to be performed for the generated still image data, wherein the second information includes at least one of (i) quality information, including a print setting, required for the image processing, and (ii) a number of pieces of still image data on which the image processing is able to be performed;

a determination unit configured to determine extracting information of each of the pieces of still image data to be extracted from the moving image data based on the first information and the second information, wherein said determination unit determines the extracting information for extracting a specified type of the pieces of still image data from the moving image data, in a case where the information includes the information indicating the presence of the inter-frame prediction, and wherein said determination unit determines the extracting information for extracting consecutive pieces of still image data subsequent from predetermined still image data, in a case where the first information includes the information indicating the absence of the inter-frame prediction;

an extraction unit configured to extract the pieces of still image data from the moving image data based on the extracting information determined by the determination unit; and a generation unit configured to generate the still image data in which the extracted pieces of still image data are combined with each other in the image processing.

2. The image processing apparatus according to claim 1, further comprising a storing unit configured to store the pieces of still image data extracted from the moving image data as a file, wherein the printing unit performs the combination operation using the pieces of still image data stored as the file and prints based on the combined still image data.

3. The image processing apparatus according to claim 1, wherein the information extraction unit extracts, as the first information, the information indicating the presence/absence of the interlace and the color format information in a case where the image processing is for generating image data with high resolution by combining the pieces of still image data.

4. The image processing apparatus according to claim 1, wherein the information extraction unit extracts the shooting information as the first information in a case where the image processing is for generating noise-reduced image data by combining the pieces of still image data.

5. An image processing method executed by an image processing apparatus that extracts pieces of still image data from moving image data and is able to generate still image data in which the extracted pieces of still image data are combined with each other, the method comprising the steps of:

extracting first information from the moving image data, wherein the first information indicates a feature of the moving image data and includes at least one of (i) information indicating a presence/absence of an interlace, (ii) color format information, (iii) information indicating a presence/absence of an inter-frame prediction, and (iv) shooting information;

obtaining a second information indicating a feature of image processing to be performed for the generated still image data, wherein the second information includes at least one of (i) quality information, including a print setting, required for the image processing, and (ii) a number of pieces of still image data on which the image processing is able to be performed;

determining extracting information of each of the pieces of still image data to be extracted from the moving image data based on the first information and the second information, wherein said determining determines the extracting information for extracting a specified type of the pieces of still image data from the moving image data, in a case where the information includes the information indicating the presence of the inter-frame prediction, and wherein said determining determines the extracting information for extracting consecutive pieces of still image data subsequent from predetermined still image data, in a case where the first information includes the information indicating the absence of the inter-frame prediction;

extracting the pieces of still image data from the moving image data based on the extracting information determined in the determining step; and generating the still image data in which the extracted pieces of still image data are combined with each other in the image processing.

6. An image processing system in which an image processing apparatus that extracts pieces of still image data from moving image data and outputs the pieces of still image data is connected to a printing apparatus that acquires the pieces of still image data and prints based on still image data, wherein the image processing apparatus comprises: an information extraction unit configured to extract first information from the moving image data, wherein the first information indicates a feature of the moving image data and includes at least one of (i) information indicating a presence/absence of an interlace, (ii) color format information, (iii) information indicating a presence/absence of an inter-frame prediction, and (iv) shooting information; a sending unit configured to send the first information to the printing apparatus; an editing unit configured to receive extracting information of each of the pieces of still image data to be extracted from the moving image data, extract the pieces of still image data from the moving image data based on the extracting information, and edit the pieces of still image data corresponding according to a number of the pieces of still image data; and a sending unit configured to send the edited pieces of still image data to the printing apparatus; and wherein the printing apparatus comprises: a receiving unit configured to receive the first information; an obtaining unit configured to obtain second information indicating a feature of image processing to be performed for the still image data, wherein the second information includes at least one of (i) quality information, including a print setting, required for the image processing, and (ii) a number of pieces of still image data on which the image processing is able to be performed; a determination unit configured to determine the extracting information of each of the pieces of still image data to be extracted from the moving image data based on the first information and the second information, and send the extracting information to the image processing apparatus, wherein said determination unit determines the extracting information for extracting a specified type of the pieces of still image data from the moving image data, in a case where the information includes the information indicating the presence of the inter-frame prediction, and wherein said determination unit determines the extracting information for extracting consecutive pieces of still image data subsequent from predetermined still image data, in a case where the first information includes the information indicating the absence of the inter-frame prediction; and a printing unit configured to receive the edited pieces of still image data, combine the edited pieces of still image data with each other, and print based on the combined still image data as the still image data.

7. The image processing system according to claim 6, further comprising a storing unit configured to store the pieces of still image data extracted from the moving image data as a file, wherein the printing unit performs the combining operation using the pieces of still image data stored as the file and prints based on the combined still image data.

8. A printing method executed by an image processing system in which an image processing apparatus that extracts pieces of still image data from moving image data and outputs the pieces of still image data is connected to a printing apparatus that acquires the pieces of still image data and prints based on a still image data, the method comprising the steps of: extracting first information from the moving image data, wherein the first information indicates a feature of the moving image data and includes at least one of (i) information indicating a presence/absence of an interlace, (ii) color format information, (iii) information indicating a presence/absence of an inter-frame prediction, and (iv) shooting information; sending the first information to the printing apparatus; receiving extracting information of each of the pieces of still image data to be extracted from the moving image data, extracting the pieces of still image data from the moving image data based on the extracting information, and editing the pieces of still image data according corresponding to a number of pieces of still image data; sending the edited pieces of still image data to the printing apparatus; receiving the first information with the printing apparatus; obtaining with the printing apparatus information indicating a feature of image processing to be performed for the still image data, wherein a second information includes at least one of (i) quality information, including a print setting, required for the image processing, and (ii) a number of pieces of still image data on which the image processing is able to be performed; determining with the printing apparatus the extracting information of each of the pieces of still image data to be extracted from the moving image data based on the first information and the second information, and sending with the printing apparatus the extracting information to the image processing apparatus, wherein said determining determines the extracting information for extracting a specified type of the pieces of still image data from the moving image data, in a case where the information includes the information indicating the presence of the inter-frame prediction, and wherein said determining determines the extracting information for extracting consecutive pieces of still image data subsequent from predetermined still image data, in a case where the first information includes the information indicating the absence of the inter-frame prediction; and receiving with the printing apparatus the edited pieces of still image data, combining with the printing apparatus the edited pieces of still image data with each other, and performing a printing operation with the printing apparatus based on the combined still image data.

9. A non-transitory computer-readable medium in which is stored a program executed by a computer that extracts pieces of still image data from moving image data and is able to generate still image data in which the extracted pieces of still image data are combined with each other, the program causing the computer to:

extract first information from the moving image data, wherein the first information indicates a feature of the moving image data and includes at least one of (i) information indicating a presence/absence of an interlace, (ii) color format information, (iii) information indicating a presence/absence of an inter-frame prediction, and (iv) shooting information ;

obtain second information indicating a feature of image processing to be performed for the generated still image data, wherein the second information includes at least one of (i) quality information, including a print setting, required for the image processing, and (ii) a number of pieces of still image data on which the image processing is able to be performed;

determine extracting information of each of the pieces of still image data to be extracted from the moving image data based on the first information and the second information, determine the extracting information for extracting a specified type of the pieces of still image data from the moving image data, in a case where the information includes the information indicating the presence of the inter-frame prediction, and determine the extracting information for extracting consecutive pieces of still image data subsequent from predetermined still image data, in a case where the first information includes the information indicating the absence of the inter-frame prediction;

extract the pieces of still image data from the moving image data based on the extracting information determined in the determine step; and generate the still image data in which the extracted pieces of still image data are combined with each other in the image processing.

* * * * *